(12) United States Patent
Hu et al.

(10) Patent No.: US 10,779,136 B2
(45) Date of Patent: Sep. 15, 2020

(54) MULTI-SYNC ENSEMBLE MODEL FOR DEVICE LOCALIZATION

(71) Applicant: Niantic, Inc., San Francisco, CA (US)

(72) Inventors: Si ying Diana Hu, Mountain View, CA (US); Anubhav Ashok, Sunnyvale, CA (US); Peter Turner, Redwood, CA (US)

(73) Assignee: Niantic, Inc., San Francisco, CA (US)

(*) Notice: Subject to any disclaimer, the term of this patent is extended or adjusted under 35 U.S.C. 154(b) by 0 days.

(21) Appl. No.: 16/455,630

(22) Filed: Jun. 27, 2019

(65) Prior Publication Data
US 2020/0008024 A1 Jan. 2, 2020

Related U.S. Application Data

(60) Provisional application No. 62/690,566, filed on Jun. 27, 2018.

(51) Int. Cl.
*H04W 4/38* (2018.01)
*G06K 9/00* (2006.01)
(Continued)

(52) U.S. Cl.
CPC .......... *H04W 4/38* (2018.02); *G06K 9/00664* (2013.01); *G06T 7/73* (2017.01); *H04W 4/029* (2018.02); *G06T 2207/10028* (2013.01)

(58) Field of Classification Search
CPC ......... H04W 4/38; H04W 4/029; H04W 4/02; H04W 4/021; H04W 4/023; H04W 4/024; H04W 4/025; H04W 4/04; H04W 4/20; H04W 4/21; H04W 4/23; H04W 4/33; H04W 88/00; H04W 88/02; H04W 88/08; H04W 16/00; H04W 16/22; H04W 84/00; H04W 84/18; H04W 56/00; H04W 4/30; H04W 64/00; H04W 84/06; H04W 16/20; G06K 9/00671; G06K 9/00; G06K 9/00664; G06K 9/00912; G06K 9/00919; G06K 9/209; G06K 2009/3225; G06K 9/00691; G06K 9/00697; G06K 9/00704; G06T 7/73; G06T 2200/04; G06T 2200/08;
(Continued)

(56) References Cited

U.S. PATENT DOCUMENTS 5,737,431 A * 4/1998 Brandstein et al. ............. 381/92
9,264,861 B1 * 2/2016 Arastafar et al. ..... H04W 4/043
(Continued)

FOREIGN PATENT DOCUMENTS

WO WO-2011/071861 A2 6/2011

OTHER PUBLICATIONS

PCT International Search Report and Written Opnion, PCT Application No. PCT/US2019/039606, dated Oct. 22, 2019, 11 pages.

*Primary Examiner* — Meless N Zewdu
(74) *Attorney, Agent, or Firm* — Fenwick & West LLP

(57) ABSTRACT

A system and method determine the location of a device. The device collects sensor data using one or more sensors. Based on the sensor data, one or more localization models are selected from a plurality of localization models. The selected models are applied to generate one or more potential locations. The current location of the device is determined based on the one or more potential locations.

20 Claims, 4 Drawing Sheets

(51) Int. Cl.
*G06T 7/73* (2017.01)
*H04W 4/029* (2018.01)

(58) Field of Classification Search
CPC ............ G06T 2219/00; G06T 2219/20; G06T 2207/10028; G06T 1/0007; G06T 7/70; G06T 7/74; G06T 7/75; G06T 15/00; G06T 15/50; G06T 17/05; H04L 67/38
See application file for complete search history.

(56) References Cited

U.S. PATENT DOCUMENTS

| | | | |
|---|---|---|---|
| 9,560,619 B2* | 1/2017 | Piji | H04W 64/00 |
| 9,781,570 B2* | 10/2017 | Cho et al. | H04W 4/027 |
| 2012/0149415 A1* | 6/2012 | Valaee et al. | 455/507 |
| 2013/0173506 A1 | 7/2013 | Ziskind et al. | |
| 2014/0193040 A1 | 7/2014 | Bronshtein | |
| 2014/0244163 A1* | 8/2014 | Zhao et al. | G01C 21/00 |
| 2014/0279790 A1 | 9/2014 | Ramachandran et al. | |
| 2015/0237471 A1* | 8/2015 | Li et al. | H04W 4/021 |
| 2015/0285638 A1 | 10/2015 | Funk et al. | |
| 2019/0204092 A1* | 7/2019 | Wheeler | G01C 21/32 |

* cited by examiner

MULTI-SYNC ENSEMBLE MODEL FOR DEVICE LOCALIZATION

I. CROSS REFERENCE TO RELATED APPLICATIONS

This application claims the benefit of Provisional Application No. 62/690,566, filed on Jun. 27, 2018, which is incorporated by reference herein.

II. FIELD OF THE DISCLOSURE

The present disclosure relates generally to location determination, and more particularly, to using sensor data to determine device location.

III. BACKGROUND

Computer-mediated reality technologies allow a user with a handheld or wearable device to alter their visual or audible perception of their environment, as experienced through the device. Augmented reality (AR) is a type of computer-mediated reality that specifically alters real-time perception of a physical, real-world environment using sensory input generated at the computing device. AR technologies may provide a computer-mediated reality including a visualization of a real-world environment of the user that includes one or more augmentations, such as virtual objects at particular locations within the visualization of the real-world environment such that the virtual objects appear to be immersive aspects of the real-world environment.

IV. SUMMARY

According to a particular embodiment, a method includes generating computer-mediated reality data, the method comprising generating three-dimensional (3-D) map data and camera location data at a client device; transmitting the 3-D map data and the client data to a remote server; receiving world map data at the client device from the remote server, wherein the world map data is generated using the 3-D map data; and generating a computer-mediated reality image at the client device.

According to another particular embodiment, an augmented reality engine comprises a locally-stored animation engine running on a portable computer, the animation engine comprising a first input that receives a stream of digital images produced by a camera integrated in the portable computer, the digital images representing a near real-time view of the environment seen by the camera; a second input that receives a geolocation position from a geolocation positioning system integrated in the portable computer; a 3D mapping engine that receives the first input and second input and estimates the distance between a camera position at a particular point in time and one or more mapping points; an output that comprises the stream of digital images produced by the camera overlaid with a computer-generated image, wherein the computer generated image is located in a particular position in the 3D map and remains positioned in the particular position as the user moves the camera to different positions in space; and a non-locally stored object detection engine in networked communication with the locally-stored animation engine; a first input received from the locally-stored animation engine, the first input comprising a digital image from the stream of digital images produced by the camera; a second input received from the locally-stored animation engine, the second input comprising the geolocation position associated with the digital image received from the locally-stored animation engine.

In various embodiments, a device collects sensor data (e.g., images, audio, Global Positioning System (GPS) data, Wi-Fi availability data, orientation and motion data (e.g., via a gyroscope, accelerometer, inertial measurement unit (IMU), etc.), light levels, sound levels, pressure data, etc. Based on the sensor data, the device selects one or more localization models for determining the location of the device. The selected one or more models are applied to the sensor data to determine one or more potential locations for the device and a current location of the device is determined from the one or more potential locations. Where there is more than one potential location, the current location may be determined as an average or weighted average of the potential locations, by selecting one of the potential locations, or other appropriate techniques. In some embodiments, the selection of the one or more models and/or the one or more potential locations may be based on which one or more models were previously used in similar locations. Two or more locations may be considered similar based on general geographic proximity and/or similarity in one or more sensor data or determinations based on the sensor data (e.g., indoors versus outdoors, low illumination versus high illumination, etc.).

Other advantages of the present disclosure are described herein.

V. BRIEF DESCRIPTION OF THE DRAWINGS

VI. DETAILED DESCRIPTION

Figure 1:
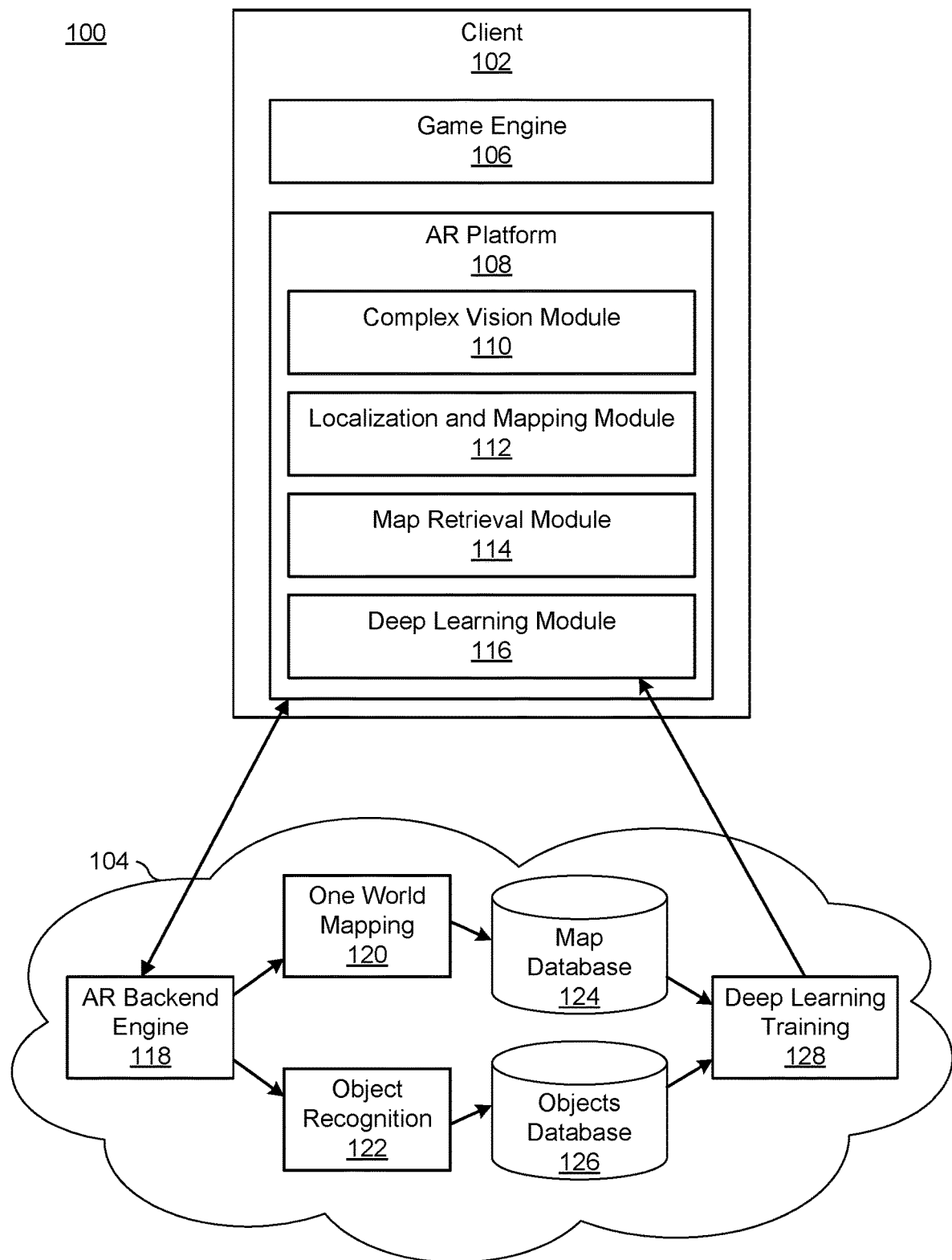
FIG. 1 illustrates an embodiment of a networked computing environment for generating and displaying augmented reality data.

A system and method create a three-dimensional (3-D) map and use the 3-D map to enable augmented reality (AR). In an embodiment, the 3-D map has a resolution of one centimeter, but maps with other resolutions may be used, including maps with variable resolution. In various embodiments, map creation is accomplished on the client side (e.g., by a mobile phone or headset), which is paired with a backend server that provides previously compiled imagery and mapping information to the client device.

In one embodiment, the system selects images and global positioning system (GPS) coordinates on a client side (e.g., on a handheld or worn electronic computing device) and pairs the selected data with a 3-D map. The 3-D map is built from camera recording modules and an inertial measurement unit (IMU), which may include an accelerometer and/or gyroscope. The selected data is sent to the server. The server and the client-side computing devices process the selected data in tandem to establish the objects and geometry of an AR, as well as to determine potential interactions among objects, virtual or otherwise, in the AR. For example, the augmented reality may be of a real-world room and may include one or more animated virtual objects that can interact with one another, e.g., for playing games.

Through use of the selected data and the 3-D map, the system may accomplish object detection and geometry estimation using neural networks, thereby providing the AR. An example of a neural network is a computational model that uses a large collection of connected units (artificial neurons) for machine learning. The units connect in software, and if the combined input signal to a unit is large enough, the unit fires its own output signal. As such, the artificial neural network mimics biological neural networks to learn to perform tasks. The system uses deep learning (e.g., a multi-layer neural network) to contextually understand AR data (e.g., for the aforementioned object detection and geometry estimation tasks).

In some embodiments, the system aggregates local 3-D maps to create one or more global 3-D maps (e.g., by linking multiple local 3-D maps together). The aggregated 3-D maps are combined into a global 3-D map on the server to generate a singular digital 3-D map of the environment, or "world." For example, multiple local 3-D maps generated by one or more devices for similar GPS coordinates that include portions that match within a predetermined threshold may be determined to overlap. As such, the overlapping portions can be used to stitch the two local 3-D maps together. The global 3-D map is used to store locations of virtual objects at specific GPS coordinates that are further indexed through 3-D points and visual images down to a specific 3-D location (e.g., with a margin of error of one foot). For example, if the "world" is a house, various local 3-D maps of various rooms may be combined into a singular global 3-D map representing the interior of the house as a whole.

Illustrative processes send map data to and from the server. As described herein, a 3-D map is a collection of 3-D points in space that represent the world or a portion of the world, in a manner analogous to 3-D pixels (or "voxels"). Image data can be sent along with the 3-D maps when available and useful, e.g. when determined to be image data for locations not yet incorporated into a 3-D map. Certain embodiments send 3-D map data without image data.

In various embodiments, a client device uses 3-D algorithms executed by a processor to generate the 3-D map. The client device sends images, the 3-D map, and GPS data in an efficient manner. For instance, images may be selectively sent so as to not bog down transmission or processing. In one example, images may be selectively sent when a camera of the client device has a novel viewpoint (e.g., the space captured by the image is not already included in one or more images at the server, or such images at the server are more than a threshold time old) but not when one or more images have already been provided for the current viewpoint. An image, for instance, is designated for sending by the algorithm when the field of view of a camera has minimal (e.g., less than a threshold) overlap with previous images from past or recent camera poses, or when the viewpoint has not been observed for an amount of time dependent on the expected movements of the objects. As another example, images may be provided if more than a threshold amount of time has elapsed since a previous image from the current (or a substantially overlapping) viewpoint was provided. This may enable the stored images associated with the map to be updated to reflect the current (or at least a recent) status of the real-world location.

In various embodiments, the server device includes a real-time detection system based on 3-D data and images to detect objects, and estimates geometry of the real-world environment. For example, a 3-D map of a room that is not photorealistic (e.g., semi-dense and/or dense 3-D reconstruction) may be determinable with images captured by the client device such that the room is fully represented within the 3-D map to a particular resolution or level of detail.

The server fuses the images, 3-D data, and/or GPS data using the real-time detection system to build a consistent and readily indexed 3-D map of the world, a composite real-world map. Once stored, the real-world map can be searched to locate previously stored real objects and/or virtual objects at particular locations in the 3-D map of the world.

In various embodiments, mapping (creation of new 3-D map data) and tracking (localization of objects, including the client device) is done on the client side. A sparse digital reconstruction of the real world is gathered, along with a location of the camera relative to the real world. Mapping includes creating a point cloud, or the collection of 3-D points. The system communicates the sparse representation back to the server by serializing and transmitting the point cloud information, along with GPS data. Cloud processing enables multiplayer capabilities among two or more client devices (sharing map data between independent client devices in real- or close to real-time) have working physical memory (storing map and virtual object data for future AR experiences not stored locally on the device) and object detection.

The server includes a database of 3-D maps and images. The server uses the GPS data to determine if a 3-D map has been previously stored for the coordinates. If located, the stored 3-D map is transmitted back to the client device. For example, a user at a home location may receive previously stored data associated with the home location. Additionally, the 3-D map and image data can be added to a stored, composite world 3-D map.

FIG. 1 is a block diagram of an AR computing system that includes a client device 102 cooperating with cloud server elements accessed via a network 104, according to one embodiment. For example, the cloud server elements may be components of a server device configured to produce AR data. In the embodiment shown, the client device 102 includes a game engine 106 (e.g., the Unity game engine or another physics/rendering engine), as well as an AR platform 108. The AR platform 108 may perform segmentation and object recognition. The AR platform 108 shown in FIG. 1 includes a complex computer vision module 110 that executes the client-side image processing (including image segmentation and local 3-D estimation, etc.).

The complex computer vision module 110 ingests pixel data from the camera of the client device as well as sensor data from other sensors of the client device, such as an inertial measurement unit. The complex computer vision module 110 uses the ingested data to generate feature vectors. The complex computer vision module 110 generates the feature vectors by performing feature extraction upon the pixel data, triangulating the camera's location and viewpoint based on the sensor data and/or pixel data, and performing feature matching upon the extracted features, thereby providing a Perspective-n-Point (PnP) estimation of camera viewpoint, as well as what objects are in the viewpoint. As described below, depending upon the context, different models may be employed to perform simultaneous localization and mapping.

The AR platform 108 also includes a localization and mapping module 112. In one embodiment, the localization and mapping module 112 uses functions from the Simultaneous Localization and Mapping (SLAM) software development kit (SDK). The SLAM SDK functions include a mapping system that builds a point cloud, line cloud, plane cloud, or any other geometric cloud for approximating real-world geometry, and provides tracking functions to find the current location of the camera in three-dimensional space. The SLAM processes further project animations or augmented values (e.g., virtual objects) into the AR such that they appear to be in the real world. In other embodiments, the localization and mapping module 112 may use different or additional approaches to mapping the environment around a client device 102 and/or determining the client device's location in that environment.

The localization and mapping module 112 may have multiple models available for determining the current location of the client device 102. In one embodiment, the models include a point cloud based model (e.g., as provided by SLAM), a plane matching model, a line matching model, a geographic information system (GIS) model, a building recognition model, a landscape recognition model, a cube matching model, a cylinder matching model, a horizon matching model, a light source matching model, etc., as well as object and/or semantic matching models, such as an outlet matching model, a street lamp matching model, a tree matching model, a text matching model (e.g., for billboards or street signs) or other models for matching real-world objects to virtual approximations. In other embodiments, different or additional models may be available to the localization and mapping module 112.

A point cloud model represents a physical space as a set of points that are located at positions in the virtual world that correspond to the positions of object surface in the real world. For example, a wall may be represented by a collection of points distributed over the wall. A given point cloud model may include a fixed number of points that are dynamically allocated to represent a physical space, such as by including a relatively small number of points on large, flat surfaces (e.g., walls) while including denser clusters of points around more complicated objects (e.g., plants, furniture, etc.). In some embodiments, the localization and mapping module 112 has multiple point cloud models available to it with varying resolutions and scales. Thus, for example, objects near a user's location may be represented by higher resolution point clouds than those further away. The point cloud model determines a location of a device by matching sensor data (e.g., camera images) generated by the device to expected sensor readings for different locations generated based on the point cloud.

A plane matching model represents a physical space as a set of planes in the virtual world at locations corresponding to large, relatively flat surfaces in the real world. For example, the floor, walls, and tabletops in a room may each be represented by a plane in the plane matching model. The plane matching model determines a location of a device by matching planes identified in sensor data (e.g., camera images) generated by the device to the planes in the model.

A line matching model is similar to a plane matching model except that it defines lines in the virtual world at locations corresponding to lines in the real world. For example, a line might be an edge of a piece of furniture, a join between two walls, etc. The line matching model determines a location of a device by matching lines identified in sensor data (e.g., camera images) generated by the device to the lines in the model.

A geographic information system (GIS) model matches pixel data to satellite imagery data. The GIS model estimates a viewpoint based on objects detected at a horizon of the viewpoint. The size and scale of objects at the horizon is estimated by the GIS model based on the pixel data (e.g., a number of pixels wide and/or tall). The GIS model then matches the estimated objects to objects included in the satellite imagery data which the GIS model projects to be at the horizon of the viewpoint. This may be performed by applying one or more mathematical transforms and/or machine-learned models (e.g., deep neural networks) to the satellite imagery data and/or the pixel data. Based on the matched objects, the GIS model identifies a likely viewpoint of the camera that generated the pixel data, and by extension, the client device 102.

The building recognition model, as well as other object and/or semantic matching models (like a tree recognition model), matches pixel data to the object or semantics it is trained to recognize. For example, the building recognition model may be a machine-learned model trained to recognize buildings based on a training data set with images of buildings labeled as positive cases and images of other objects labeled as negative cases. Upon training, the building recognition model can predict whether pixel data (e.g., an image) includes a building. Similarly, models can be trained to recognize a wide array of objects that may be present in an image, such as street signs, trees, benches, and the like.

Regardless of the set of models that is available, the client device 102 selects one or more of the models for localization based on the raw data collected. For example, the plane and line matching models might be most accurate indoors whereas the landscape and building models might be most accurate outdoors. Thus, collected data (e.g., illumination level and images) might be analyzed by the localization and mapping module 112 to determine whether the client device 102 is currently indoors or outdoors and then select the more effective models.

In one embodiment, each model is assigned a score indicating a likelihood that the model will generate an accurate location for the client device based on the current circumstances (e.g., as indicated by the collected data). The scores may be based on a decision tree, where the parameters of the decision tree are manually set. Alternatively, the scores may be based on a machine learning model trained with reinforcement learning using the inputs and parameters of the different models from different AR map types, where the reinforcement "reward" is proportional to model performance, e.g., location estimate accuracy.

A model or multiple models are selected based on the scores. For example, the client device 102 might select the model with the highest score, the three highest scoring models, or all models with a score above a threshold. Additionally or alternatively, the selection may be based on which models were previously selected at similar locations. For example, if the GPS coordinates for the client device 102 are within a threshold of GPS coordinates where the plane matching model was previously used successfully, the score of the plane matching model might be boosted, or the plane matching model might be selected unless another model's score exceeds the score for the plane matching model by a threshold amount. Similarly, if a particular model was previously selected and failed to provide an accurate location, the score for that model may be reduced. Thus, the successes and failures of the models at similar GPS coordinates may be used to inform which model or models the client device 102 selects to determine a more precise location than is provided by the GPS coordinates (e.g., to within one centimeter).

In a similar way, the client device 102 may factor for the successes and failures of the models at locations that the collected data indicates are similar to the current location. For example, locations may be classified as indoors or outdoors and certain models may be ruled out or selected (or the corresponding scores increased or decreased) based on whether the collected data indicates the client device 102 is indoors or outdoors. The collected data may be analyzed by one or more models (e.g., object recognition models) to determine whether it was collected indoors or outdoors by the employment of models for objects that are characteristically indoors or outdoors. For example, using models for trees, sky, and grass to determine that data was collected outside, and models for walls, couches, and tables to determine that data was collected inside.

Similarly, the model or models selected may be based on illumination level. For example, one model (e.g., a line cloud) may be particularly effective relative to the others in low light conditions and thus be preferentially selected if the illumination level detected by the client device 102 is below a threshold. Similarly, other models (e.g., point maps) may be less effective in low light conditions, and thus avoided (assuming another model is available). Depending upon the embodiment, other techniques for the collected data to impact which model or models are selected to favor selection of those that are most likely to produce an accurate result in the current conditions may be employed.

The localization and mapping module 112 may apply the selected one or more models to generate potential locations for the client device 102. In the case where only a single model was selected, the generated location may be used as the actual location of the client device 102. However, where GPS coordinates are available, if the location determined using the model differs from the GPS coordinates by more than a threshold amount, the client device 102 may apply additional models or otherwise seek to verify the current location, such as by displaying a message asking the user to confirm whether a location estimate is accurate, and updating the location estimate based on a received response.

Where more than one model is selected, each selected model may produce a potential location of the client device 102. The localization and mapping module 112 determines a current location for the client device 102 based on the cumulative potential locations of the more than one selected models. In one embodiment, the current location is calculated as the mean of the potential locations generated by the selected models. In another embodiment, a weighted average of the potential locations is used. For example, the contribution of each model may be weighted by its score from the model selection phase. Alternatively, the weightings may be preset to favor certain models over others, e.g., based on historical accuracy. In further embodiments, the potential locations may be combined in other ways, such as taking the one that most closely matches the device's GPS coordinates.

In the embodiment shown in FIG. 1, the client computing device 102 also includes a map retrieval module 114 and a deep learning module 116. The map retrieval module 114 retrieves previously generated 3-D maps (e.g., via the network 104). In some embodiments, the map retrieval module 114 may store some 3-D maps (e.g., a 3-D map for a user's home location) locally. The deep learning module 116 applies machine-learned algorithms for object recognition. The deep learning module 116 may obtain trained machine-learned algorithms via the network 104. In some embodiments, the deep learning module 116 may also provide results of object recognition and/or user feedback to enable further model training.

In the embodiment shown, the cloud server elements accessed via the network 104 (e.g., at a server computing device) include an AR backend engine 118 in communication with a one world mapping module 120, an object recognition and semantic segmentation module 122, a map database 124, an objects database 126, and a deep learning training module 128. In other embodiments, additional or different components may be included. Furthermore, the functionality may be distributed differently than described herein. For example, some or all of the object recognition functionality may be performed at the client device 102.

The AR backend engine receives data from the client device 102 and sends 3-D map information and/or other data to the client device 102. The AR backend engine sends received data to the one world mapping module 120 and/or the object recognition and semantic segmentation module 122 based on the type of received data such that it may be further processed.

The one world mapping module 120 fuses different local 3-D maps together to create a composite real-world map. As noted previously, GPS position data from the client device 102 that initially generated the map may be used to identify local maps that are likely to be adjacent or overlapping. Pattern matching may then be used to identify overlapping portions of the maps or that two local maps are adjacent to each other (e.g., because they include representations of opposite sides of the same object). If two local maps are determined to overlap or be adjacent, a mapping can be stored (e.g., in the map database) indicating how the two maps relate to each other, or they may be combined into one 3-D map.

The object recognition and semantic segmentation module 122 uses images and/or object information and collected 3-D data to identify features in the real world. In this manner, the server 104 determines that a chair, for example, is at a 3-D location and accesses an object database 126 associated with the location. The deep learning training module 128 may be used to fuse the map information with the object information, e.g., to add a representation of the object to the 3-D map at the location as represented in the 3-D map. In this manner, the system 100 may connect 3-D information for object recognition and for fusion back into a 3-D map. Alternatively or additionally, the deep learning training module 128 may be used to train or update machine learned models for object recognition. For example, the results of the application of the object recognition and semantic segmentation module 122 to the 3-D data may be verified (e.g., by a human), such that the deep learning training module 128 can expand the training data set or update a model based on the verification.

The map database 124 includes one or more computer-readable media configured to store the map data generated by client devices 102. The map data can include local maps of 3-D point clouds stored in association with images and other sensor data collected by client devices 102 at a location. The map data may also include mapping information indicating the geographic relationship between different local maps. Similarly, the objects database 126 includes one or more computer-readable media configured to store information about recognized objects. For example, the objects database 126 might include a list of known objects (e.g., chairs, desks, trees, buildings, etc.) with corresponding locations along with properties of those objects. The properties may be generic to the object type or defined specifically for each instance of the object (e.g., all chairs might be considered furniture but the location of each is defined individually). Although the map database 124 and the objects database 126 are shown as single entities, they may be distributed across multiple storage media at multiple devices (e.g., as a distributed database), or may be one combined database.

Figure 2:
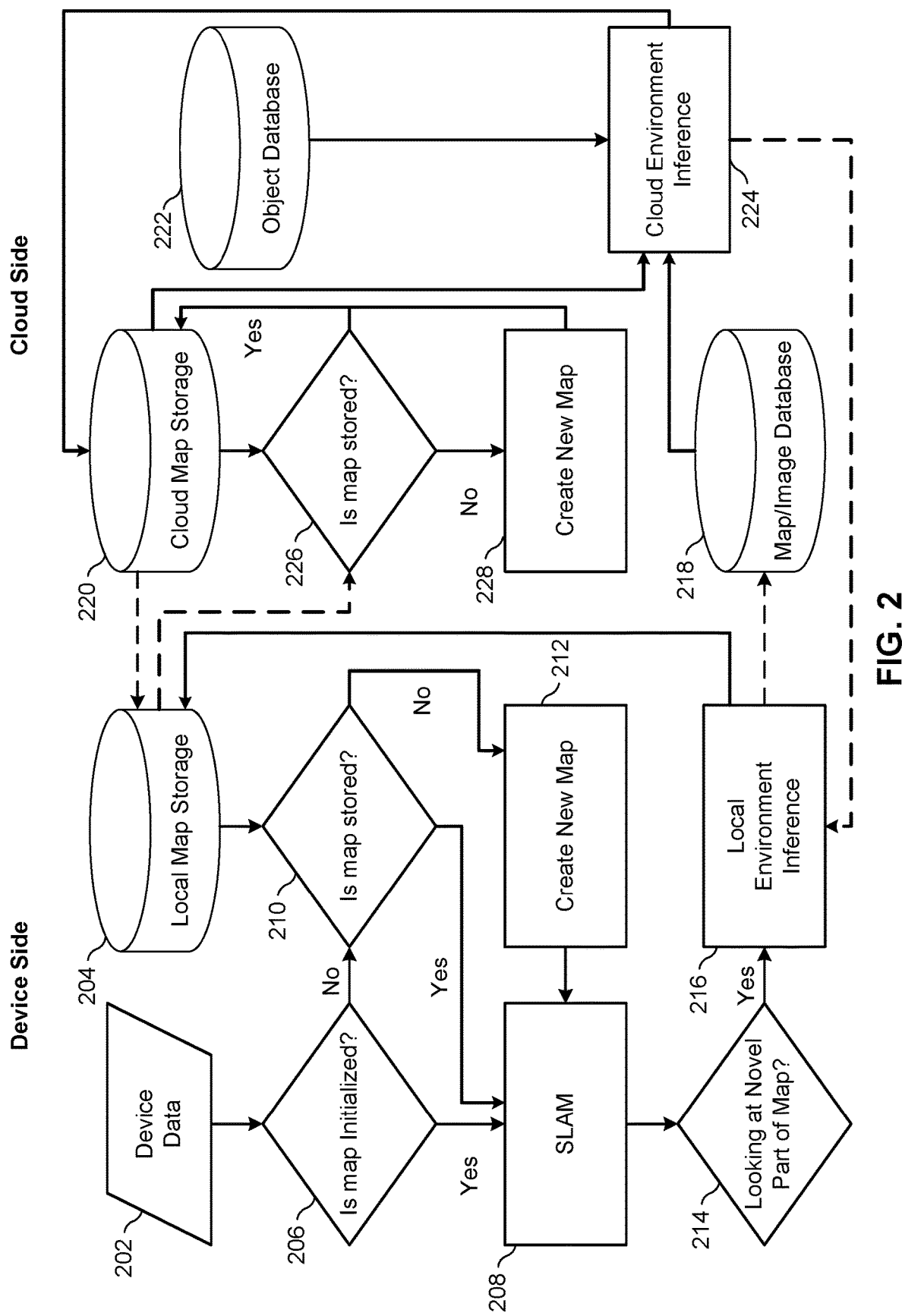
FIG. 2 is a flowchart that illustrates processes that are executable by the computing system of FIG. 1 for generating and displaying augmented reality data, according to one embodiment.

FIG. 2 is a flowchart showing processes executed by a client device 102 and a server device to generate and display AR data, according to one embodiment. The client 102 and server computing devices may be similar to those shown in FIG. 1. Dashed lines represent the communication of data between the client 102 and server while solid lines indicate the communication of data within one of the devices. In other embodiments, the functionality may be distributed differently between the devices and/or different devices may be used.

At 202, raw data is collected at the client device by one or more sensors. In one embodiment, the raw data includes images and inertial measurement information. The images are captured by one or more cameras. The inertial measurement information may be collected using GPS and gyroscope and/or accelerometer components on the client device or another device communicatively connected to the client device. Additional raw data may be collected, such as pressure levels, illumination levels, sound levels, audio data, et cetera, in alternative embodiments.

The client device 102 may maintain a local map storage at 204. The local map storage includes local point cloud data. The point cloud data comprises positions in space that form mesh surfaces that can be built up such that the point cloud data is representative of one or more objects in a location.

If a 3-D map is initialized at 206, then the client device 102 may initiate at 208 the SLAM functions. The SLAM functions include a mapping system that builds up the point cloud and tracking functionality to find the location of and/or orient the camera in space. The SLAM processes project virtual objects such that they appear to be in the real world in the AR experience. If no 3-D map is initialized at 206, the client device 102 may identify a stored 3-D map, either in the local map storage 204 or by query to cloud map storage 220, and load the stored 3-D map for use. If no map is located at 210, the system uses an initialization module to create a map at 212.

Where a novel viewpoint is detected at 214 (e.g., if turning a corner into an area that has not been mapped/imaged or where there is an overlap and not all of the currently visible portion of the real world has been mapped/imaged), the system may record at 216 data gathered about the local environment and/or inferenced (e.g., using object recognition). For example, upon determining that the client device 102 currently has a novel viewpoint, images captured by the camera with that viewpoint may be sent to the server by the client device 102. The client device 102 may use a novel viewpoint detector to determine when and how to transmit images with 3-D data. The local environment inferences may include updated keyframes for the local mapping system and serialized image and/or map data.

On the server side, novel viewpoint data (e.g., comprising point cloud information with mesh data) may be stored at 218 in cloud map storage. The server may add different parts of a real-world map from stored cloud map storage 220 and an object database 222 to the novel viewpoint data, such as labels for objects recognized using machine learning as described above. The cloud environment inference 224 (comprising the added data, e.g., semantic labels for recognized objects) may be sent back to the client device 102. The added data may include points and meshes and object data, and may be sent to be stored at local map storage 204.

Figure 3:
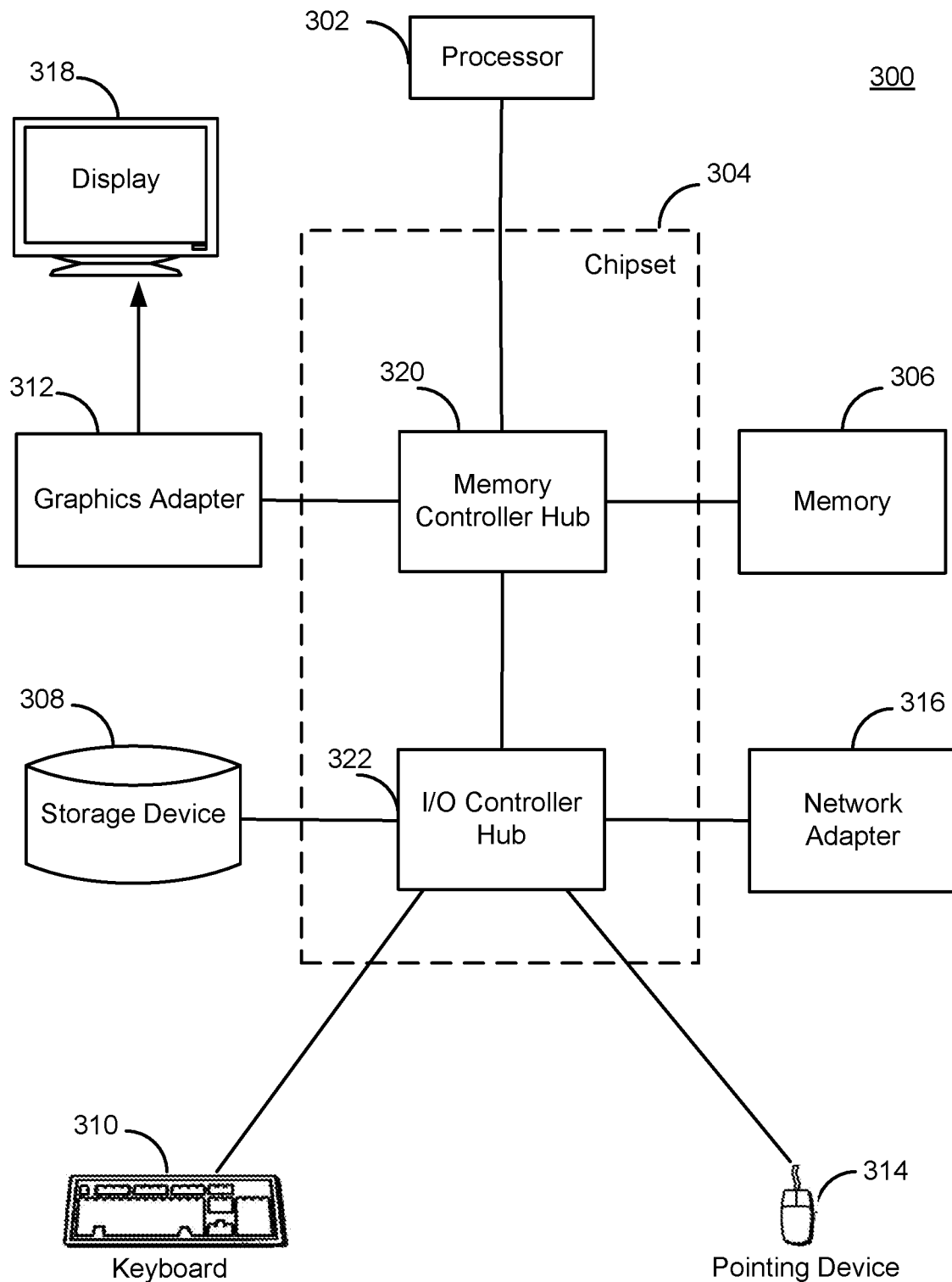
FIG. 3 is a block diagram illustrating an example computer system suitable for use in the networked computing environment of FIG. 1, according to one embodiment.

FIG. 3 is a high-level block diagram illustrating an example computer 300 suitable for use as a client device 102 or a server. The example computer 300 includes at least one processor 302 coupled to a chipset 304. The chipset 304 includes a memory controller hub 320 and an input/output (I/O) controller hub 322. A memory 306 and a graphics adapter 312 are coupled to the memory controller hub 320, and a display 318 is coupled to the graphics adapter 312. A storage device 308, keyboard 310, pointing device 314, and network adapter 316 are coupled to the I/O controller hub 322. Other embodiments of the computer 300 have different architectures.

In the embodiment shown in FIG. 3, the storage device 308 is a non-transitory computer-readable storage medium such as a hard drive, compact disk read-only memory (CD-ROM), DVD, or a solid-state memory device. The memory 306 holds instructions and data used by the processor 302. The pointing device 314 is a mouse, track ball, touch-screen, or other type of pointing device, and is used in combination with the keyboard 310 (which may be an on-screen keyboard) to input data into the computer system 300. The graphics adapter 312 displays images and other information on the display 318. The network adapter 316 couples the computer system 300 to one or more computer networks.

The types of computers used by the entities of FIG. 1 can vary depending upon the embodiment and the processing power required by the entity. For example, a server might include a distributed database system comprising multiple blade servers working together to provide the functionality described. Furthermore, the computers can lack some of the components described above, such as keyboards 310, graphics adapters 312, and displays 318.

Figure 4:
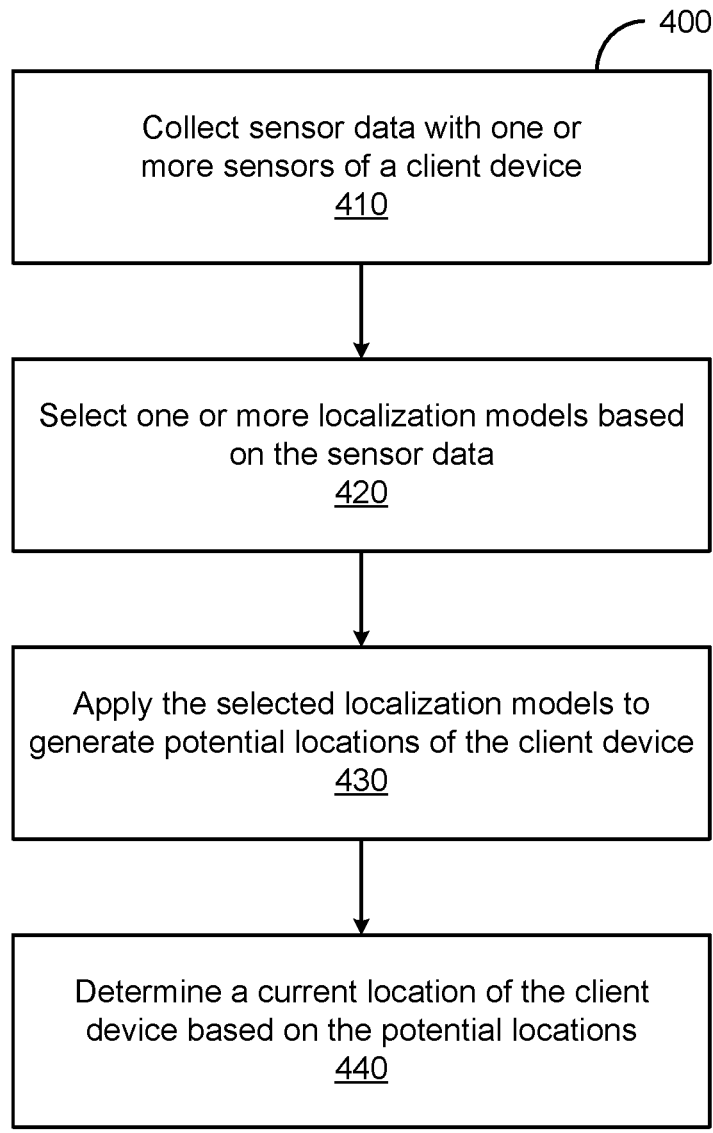
FIG. 4 is a flowchart illustrating a method for determining the location of a device, according to one embodiment.

FIG. 4 illustrates one embodiment of a method 400 for determining the location of a device. The steps of FIG. 4 are illustrated from the perspective of a client device 102 performing the method 400. However, some or all of the steps may be performed by other entities or components. In addition, some embodiments may perform the steps in parallel, perform the steps in different orders, or perform different steps.

In the embodiment shown in FIG. 4, the method 400 begins with the client device 102 collecting 410 sensor data using one or more sensors. The sensor data may include images, video, audio, light levels, sound levels, inertial data, orientation, pressure, and/or any other available data from sensors. Based on the sensor data, the client device 102 selects 420 one or more localization models. As described previously, the model or models selected may be based on scores assigned to the models, where the scores are based on the sensor data and/or additional factors, such as historic performance at particular locations or environments.

The client device 102 applies 430 the selected localization models to generate potential locations for the client device. In one embodiment, each model outputs a potential location. The potential locations may be defined based on a coordinate system within a local map (e.g., as selected based on the GPS coordinates of the client device 102). For example, GPS coordinates may indicate that the client device 102 is likely somewhere within a building, so a local map for that building is used. The selected models are then applied to determine a more accurate location of the client device 102 within the building (e.g., aiming for a precision of one centimeter).

The client device 102 determines 440 a current location based on the potential locations. Where only one model was selected, the potential location it generates may be assumed to be correct. Alternatively, the potential location may be checked for viability based on available sensor data (e.g., that it is within a threshold distance of the location indicated by GPS coordinates, that detected illumination levels are consistent with expectations for the potential location, that an image captured by the client device 102 is consistent with other images captured at similar locations, etc.). When more than one model is selected, the potential locations may be combined to produce a current location. As described previously, an average, weighted combination, or other suitable technique may be used to generate a current location from the potential locations.

Those skilled in the art can make numerous uses and modifications of and departures from the apparatus and techniques disclosed herein without departing from the described concepts. For example, components or features illustrated or described in the present disclosure are not limited to the illustrated or described locations, settings, or contexts. Examples of apparatuses in accordance with the present disclosure can include all, fewer, or different components than those described with reference to one or more of the preceding figures. The present disclosure is therefore not to be limited to specific implementations described herein, but rather is to be accorded the broadest scope possible consistent with the appended claims, and equivalents thereof.

The invention claimed is:

1. A method for determining a location of a device, the method comprising:
    collecting image data captured by a camera on the device and global coordinates detected by a global positioning system (GPS) receiver on the device;
    determining whether the device is currently indoors or outdoors based on an illumination level of the image data;
    selecting one or more localization models from a plurality of localization models based on the determination of whether the device is currently indoors or outdoors;
    applying the selected one or more localization models to the image data and the global coordinates to generate one or more potential locations of the device; and
    determining the location of the device based on the one or more potential locations.

2. The method of claim 1, wherein the plurality of localization models includes at least one of: a point cloud based model, a plane matching model, a line matching model, a geographic information system (GIS) model, a building recognition model, an object recognition model, a semantic matching model, a cube matching model, a cylinder matching model, a horizon matching model, a light source matching model, and a landscape recognition model.

3. The method of claim 1, wherein applying the selected one or more localization models comprises applying a plurality of localization models to generate a plurality of potential locations, wherein each applied localization model generates one of the plurality of potential locations.

4. The method of claim 1, wherein determining the location of the device comprises calculating an average location of the plurality of potential locations.

5. The method of claim 4, wherein the average is a weighted average.

6. The method of claim 1, wherein selecting the one or more localization models comprises:
    assigning a score to each localization model of the one or more localization models, the score assigned to each localization model indicating a corresponding likelihood of that localization model generating an accurate location; and
    selecting the one or more localization models based on the scores for the one or more localization models.

7. The method of claim 6, wherein the score assigned to each localization model is based on historic performance of the models in similar environments.

8. The method of claim 6, wherein the score assigned to each localization model is based on the image data and the global coordinates.

9. A device comprising:
    one or more processors; and
    one or more computer-readable media storing instructions that, when executed by the one or more processors, cause the one or more processors to perform operations including:
        collecting image data captured by a camera on the device and global coordinates detected by a global positioning system (GPS) receiver on the device;
        determining whether the device is currently indoors or outdoors based on an illumination level of the image data;
        selecting one or more localization models from a plurality of localization models based on the determination of whether the device is currently indoors or outdoors;
        applying the selected one or more localization models to the image data and the global coordinates to generate one or more potential locations of the device; and
        determining a location of the device based on the one or more potential locations.

10. The device of claim 9, wherein the plurality of localization models includes at least one of: a point cloud based model, a plane matching model, a line matching model, a geographic information system (GIS) model, a building recognition model, an object recognition model, a semantic matching model, a cube matching model, a cylinder matching model, a horizon matching model, a light source matching model, and a landscape recognition model.

11. The device of claim 9, wherein applying the selected one or more localization models comprises applying a plurality of localization models to generate a plurality of potential locations, wherein each applied localization model generates one of the plurality of potential locations.

12. The device of claim 9, wherein determining the location of the device comprises calculating an average location of the plurality of potential locations.

13. The device of claim 12, wherein the average is a weighted average.

14. The device of claim 9, wherein selecting the one or more localization models comprises:
    assigning a score to each localization model of the one or more localization models, the score assigned to each localization model indicating a corresponding likelihood of that localization model generating an accurate location; and
    selecting the one or more localization models based on the scores for the one or more localization models.

15. The device of claim 14, wherein the score assigned to each localization model is based on historic performance of the models in similar environments.

16. The device of claim 14, wherein the score assigned to each localization model is based on the image data and the global coordinates.

17. A non-transitory computer-readable storage medium storing instructions for determining a location of a device, wherein the instructions, when executed by a processor, cause the processor to perform operations comprising:
- collecting image data captured by a camera on the device and global coordinates detected by a global positioning system (GPS) receiver on the device;
- determining whether the device is currently indoors or outdoors based on an illumination level of the image data;
- selecting one or more localization models from a plurality of localization models based on the determination of whether the device is currently indoors or outdoors;
- applying the selected one or more localization models to the image data and the global coordinates to generate one or more potential locations of the device; and
- determining a location of the device based on the one or more potential locations.

18. The storage medium of claim 17, wherein the plurality of localization models includes at least one of: a point cloud based model, a plane matching model, a line matching model, a geographic information system (GIS) model, a building recognition model, an object recognition model, a semantic matching model, a cube matching model, a cylinder matching model, a horizon matching model, a light source matching model, and a landscape recognition model.

19. The storage medium of claim 17, wherein determining the location of the device comprises calculating an average location of the plurality of potential locations.

20. The storage medium of claim 19, wherein the average is a weighted average.

* * * * *